United States Patent [19]

Greenwood

[11] Patent Number: 5,338,268
[45] Date of Patent: Aug. 16, 1994

[54] TOROIDALRACE ROLLING-TRACTION TYPE TRANSMISSION

[75] Inventor: Christopher J. Greenwood, Preston, England

[73] Assignee: Torotrak (Development) Limited, England

[21] Appl. No.: 50,434

[22] Filed: Jun. 10, 1993

[30] Foreign Application Priority Data

Nov. 16, 1990 [GB] United Kingdom ............... 9024987

[51] Int. Cl.⁵ .................................................. F16H 15/08
[52] U.S. Cl. ...................................... 476/10; 476/40; 476/42
[58] Field of Search ..................... 476/10, 40, 42, 45, 476/46

[56] References Cited

U.S. PATENT DOCUMENTS

| Re. 26,917 | 6/1970 | Dickenbrock | 476/40 X |
|---|---|---|---|
| 1,056,292 | 3/1913 | Nettenstrom . | |
| 2,318,471 | 5/1943 | Dodge . | |
| 3,371,546 | 3/1968 | Spangler et al. | 476/10 |
| 4,400,987 | 8/1983 | Kraus . | |
| 4,713,978 | 12/1987 | Perry | 476/10 X |

FOREIGN PATENT DOCUMENTS

| 0133330 | 12/1989 | European Pat. Off. . | |
|---|---|---|---|
| 0354013 | 10/1992 | European Pat. Off. . | |
| 2127530 | 12/1971 | Fed. Rep. of Germany | 476/10 |
| WO90/05860 | 5/1990 | PCT Int'l Appl. . | |
| 410150 | 5/1934 | United Kingdom | 476/42 |
| 596331 | 1/1948 | United Kingdom . | |
| 1069874 | 5/1967 | United Kingdom . | |
| 1078791 | 8/1967 | United Kingdom . | |
| 2023753 | 12/1982 | United Kingdom . | |

*Primary Examiner*—Allan D. Herrmann
*Assistant Examiner*—David W. Laub
*Attorney, Agent, or Firm*—Davis, Bujold & Streck

[57] ABSTRACT

A ratio-varying component for a continuously-variable-ratio transmission of the toroidal-race rolling-traction type, in which each roller (20) spans the toroidal clearance between its respective input (4, 5) and output (11, 12) discs diametrically and the roller center (20b) is capable in operation of limited movement back and forth along the center circle (22a) of the clearance, and in which stop means (40, 41; 30, 33) are mounted adjacent both the outer and inner edges of the part-toroidal races (22, 23) on the discs, to prevent the rollers from running off the edges.

11 Claims, 2 Drawing Sheets

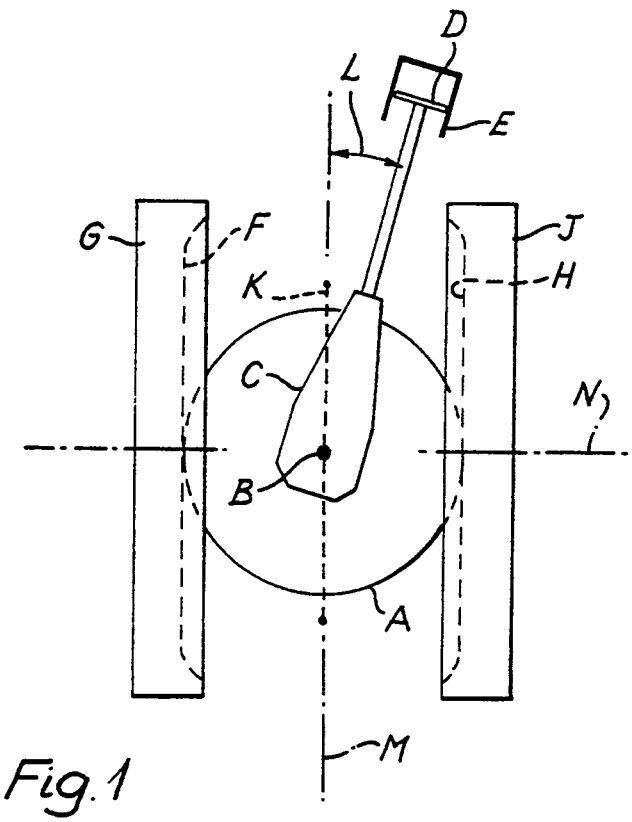
Fig. 1
PRIOR ART
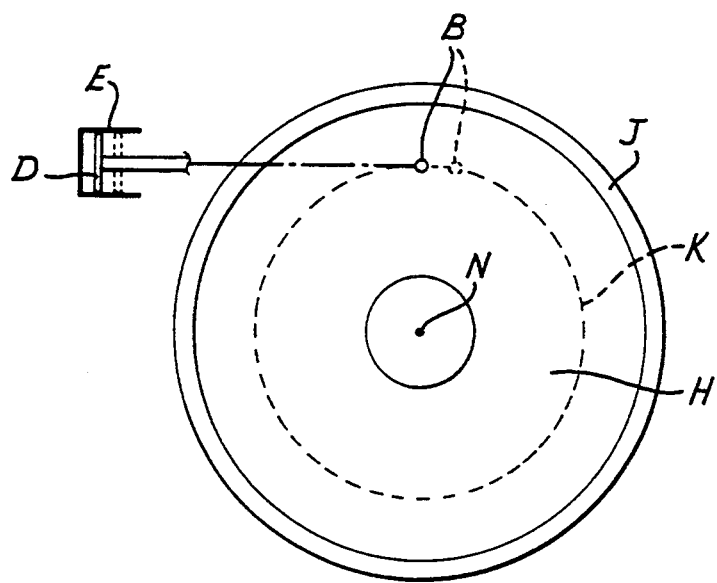
PRIOR ART Fig. 2

TOROIDALRACE ROLLING-TRACTION TYPE TRANSMISSION

FIELD OF THE INVENTION

This invention relates to variators, that is to say the ratio-varying components, of transmissions of the toroidal-race rolling-traction type.

BACKGROUND OF THE INVENTION

In such variators, as is well known, grouped rollers of variable orientation transmit traction between matching part-toroidal races formed on the confronting faces of coaxial and contra-rotating input and output discs. The rotary velocity transmitted from the input to the output disc changes when the orientation of the rollers changes: when the rollers contact the input disc at a relatively high radius and the output disc at a relatively low one, the output disc rotates faster than the input disc and the variator is said to be set at a high ratio, whereas if the rollers contact the input disc at low radius and the output disc at high radius then the output disc rotates slower and the variator is in low ratio. Such variators have been described in many prior patent specifications within this century, for instance U.S. Pat. No. 1,056,292, GB-A-1078791, and more recently WO90/05860. More particularly, the invention applies to variators of the toroidal-race rolling-traction type having two further characteristics. Firstly, the rollers span the part-toroidal clearance between their respective input and output discs substantially diametrically, so that the centre of each roller lies substantially on the imaginary centre circle of the torus. The invention thus applies to variators of the so-called "full toroidal" type of which all three of the prior patent specifications Just recited show examples, but not to variators of the so-called "half toroidal" type, which pose quite different problems of construction and operation and of which specification U.S. Pat. No. 4,400,987 shows one example. Secondly, the invention applies to variators of the full-toroidal type in which, as in specification WO90/05860, the centre of each roller must be free in normal operation of the variator, for instance during ratio changes, to make limited movements back and forth around the circumference of the torus centre circle. The invention does not apply to the alternative type of toroidal-race variator, of which specification GB-A-1069874 shows examples, in which the roller centre is constrained to a single location on the torus centre circle.

Diagrammatic FIGS. 1 and 2 of the accompanying drawings show certain features and components of a variator of the type to which the invention can apply. FIG. 1 is a view in a plane at right angles to the disc axis and FIG. 2 a view in a plane including that axis. In FIG. 1 a roller A ia mounted to rotate about its centre B which mounted in a carriage C connected to a piston D working in a cylinder E. Roller A transmits traction from a part-toroidal race F formed in a disc G to a corresponding race H formed on a coaxial disc J. As in examples shown in specification WO90/05860, piston D not only moves axially within cylinder E but can also tilt slightly relative to the cylinder axis. Both Figures show clearly that any control movement of roller A, by movement of piston D within cylinder E, must have the effect of moving the centre B of the roller. As FIG. 2 shows best, because roller A spans the toroidal clearance diametrically, the consequent movement of centre B must be along the centre circle K of the torus. FIG. 1 also shows that the line of action of piston D on roller A lies at an angle (L) to the plane M which includes the centre circle K. The angle L is known in the art as caster angle, and is present in many known variators of this kind including the ones described in specification WO90/05860.

It is a well known characteristic of variators of toroidal-race CVT's, in which such caster angle is present, that they are unidirectional in operation. That is to say, predictable changing of the transmitted ratio, by unison variation of the orientation of the rollers, is only possible if the input disc or discs are rotating in one rotary sense about the variator axis, and the output disc or discs in the other sense. The reason for this is well understood in the art, and in summary is that the necessary geometry for the mounting of the rollers includes caster angle as shown in FIG. 1. It is therefore important that the input shafts of variators of CVT's of this type should never rotate backwards to any material degree.

In practice the internal combustion engines that have usually served as the prime movers for variators of this type have been designed to rotate forwards only, and the slight backwards movements that they have been subject to, for instance to take up an equilibrium position when shut down, have been insufficient to upset the roller orientation of previous generations of toroidal-race variators, because no more than say a single backwards revolution ever took place at one time. The response rate of such variators required several revolutions of the input disc or discs for the rollers to steer themselves through any substantial change of orientation. The present invention arises from the fact that with a more modern hydraulic mounting and control of the rollers, as described in WO90/05860 for instance, substantial change of roller orientation is much more rapid, and can occur within as little as a small fraction of a revolution of the input disc or discs. The possibility of the rollers changing orientation rapidly and unpredictably, and even running off the input and/or output races, within a single backward revolution of the input shaft, for instance on engine shut down or following a false start, therefore becomes a real one and should be guarded against.

BRIEF DESCRIPTION OF THE DRAWINGS

FIG. 1 and FIG. 2 are diagrammatic views of a prior art variator; and

DESCRIPTION OF THE PREFERRED EMBODIMENT

Figure 3:
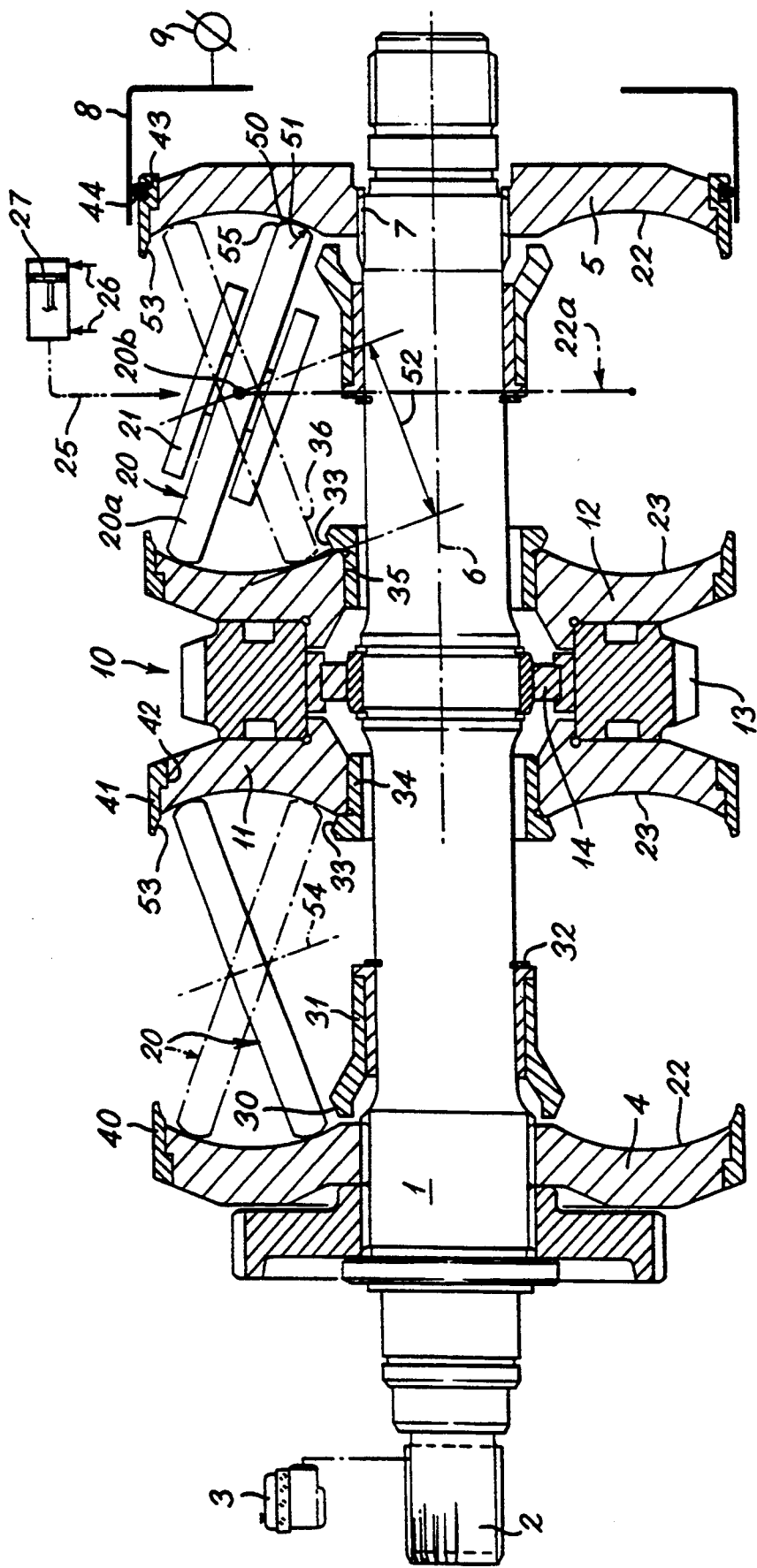
FIG. 3 shows a variator according to the present invention.

The invention is defined by the claims, the contents of which are to be read as included within the disclosure of this specification, and the invention will now be described by way of example with reference to FIG. 3 of the accompanying drawings in which some features are shown only schematically but which also includes a simplified axial section through a variator.

The variator input shaft 1, formed at one end with a spline 2 for rotation about axis 6 by an engine indicated at 3, carries two input discs 4 and 5 located at opposite ends of the shaft. Disc 4 is prevented from moving either axially or in rotation relative to the shaft. Disc 5 is prevented from relative rotation, but the keyed connection at 7 allows limited relative axial movement between shaft and disc, because disc 5 acts as piston within a cylinder 8, connected to an appropriate hydraulic power supply 9, to exert the necessary and customary "end load" upon the variator. Between discs 4 and 5, the output member 10 of the variator comprises two output discs 11 and 12 carried on opposite faces of a gear 13: output unit 10 rotates with clearance around shaft 1 on a bearing 14.

As is customary in variators of this kind, sets of rollers 20, mounted in carriages 21 (comparable to carriage C of FIGS. 1 and 2), transmit traction between part-toroidal races 22, formed on input discs 4 and 5, and complementary part-toroidal races 23 formed on output discs 11 and 12. Only one roller/carriage set 20/22 is shown between discs 4 and 11, and similarly only one between discs 5 and 12, but in practice there will usually be a set of three rollers between each set of discs, the three rollers being spaced apart from each other at 120° of arc around axis 6, and as taught in patent publication WO/05860 the orientation all six rollers would be controlled by a common hydraulic control system (see 25–27) to ensure that they all transmit equal ratios at all times while under drive. As in FIG. 1 and 2, the centre 20b of each roller is constrained to lie on the imaginary centre circle 22a of the common torus of races 22 and 23, but capable in operation—under the influence of control mechanism like the piston-and-cylinder combination D/E of FIGS. 1 and 2—of making limited movements back and forth along that circle.

As taught in many prior publications of hydraulic roller control systems in this art, and in particular for example in patent specifications GB-C-2023753, EP-B-0133330 and EP-A-0354013 the hydraulic circuit (25) by which the position of the roller carriages 21 and thus of the rollers 20 is controlled during drive conditions, contains "hydraulic end-stop" features (26) which come into play when the pistons 27 approach the ends of their permitted strokes, whereby to adjust the balance of hydraulic pressures to either side of the piston and oppose further piston movement towards and beyond the stroke end. However when hydraulic power is released, for instance when the engine is shut down at the end of a run or fails to fire when started, such hydraulic stops will not operate. Furthermore, if on such occasions the engine output shaft turns backwards by even a small amount—say even less than half a revolution—then the combination of quick roller response and the unpredictable roller movement caused by reverse input rotation may cause at least some of the rollers within the variator to change orientation so violently that they are in danger of running off the edges of the races 22 and 23. According to the present invention, that risk of the rollers running off the edges of their races is countered by providing physical fences. At the radially-inner edges of the input races 22, stops 30 are provided by collars 31 mounted around input shaft 1 and held in place by circlips 32. For output races 23, similar stops 33 are provided by collars 34 which engage with the rims 35 of the central cavities of the annular output discs 11 and 12. It should be particularly noted that stops 30 and 33 engage with the flat faces 36 of the rollers, and that they rotate in the same sense, relative to axis 6, as the discs with which they are associated, so minimising relative speed whenever they engage with the rollers. If stop 33 were to be mounted on shaft 1, like stop 30, then because of the contra-rotation of discs 11, 12 and shaft 1 there would be considerable relative movement between roller 20 and stop 33 whenever engagement took place. Instead of being mounted around the input shaft 1, stops of equivalent function to items 30 could of course be mounted in other ways. For instance they could be integral with or otherwise fixed to the discs with which they are associated.

At the outer edges of the input (4, 5) and output (11, 12) discs, similar stop action is provided by ring fences 40, 41. These could be formed integrally with the discs themselves, but as shown are separate components and are fitted to the outer rims of the discs, with a geometry including a step 42 to resist any tendency for engagement between fences and rollers to dislodge the fences axially from the discs on which they are mounted. The stepped construction also facilitates forming a groove 43 to receive the ring seal 44 which engages with cylinder 8, within which the disc 5 at the right-hand side of the figure acts as an end-load piston as already described. It should be noted that because the centres 20b of the rollers 20 are not positively located relative to the fixed structure of the variator, but must instead be capable of limited movement back and forth along the torus centre circle 22a, provision of stops at only one of the two radial extremities of each race could be insufficient, because if a roller were then to make contact with such a stop, that point of contact could act as the fulcrum for the roller to pivot, causing the opposite end of the roller diameter to ride off the unstopped opposite radial extremity of the opposite discs.

As is customary in the art, and as is shown exaggeratedly for the roller 20a at the right-hand side of the figure, the roller end 50 is rounded to a radius 51 which Is much less than the full radius 52 of roller 20, and which is known in the art as the roller cross-radius. Roller end 50 meets the flat face 36 of the roller at an edge 55, and the curvature of the working faces 53 of fences 40 and 41 may conveniently be chosen so as to match that which would be generated by the edge 55 If a roller, when running at one extreme of its permitted ratio range under drive, were to tend to change to an even greater ratio and so move out of that permitted range. It should be noted that when a roller is running close to the limit of its permitted range as just described, the roller axis 54 typically intersects the variator axis 6. The choice of the described curvature for the working faces 53 of the fences helps to provide maximum clearance between fences and rollers when the latter are running at the limits of their permitted ranges, and so to minimise the size of the extra annulus of race that it is necessary to provide, beyond the radius at which roller and race make contact in that limiting condition, before the fence begins.

I claim:

1. A variator for a continuously-variable-ratio transmission of the toroidal-race rolling-traction type, said variator comprising:

a plurality of rollers (20);

input discs (4, 5) and output discs (11, 12) each having an inner and an outer edge and each forming part-toroidal races (22, 23), each of said plurality of rollers spaning a toroidal clearance between its respective input and output discs diametrically, and a center (20b) of each of said plurality of rollers being capable of limited movement back and forth, during use, along a center circle (22a) of the toroidal clearance;

wherein stop means (40, 41, 30, 33) are mounted adjacent both the inner and outer edges of the part-toroidal races (22, 23) of both said input and said output discs between which said plurality of rollers are positioned in order to prevent each of said plurality of rollers from running off one of the inner and outer edges.

2. A variator according to claim 1, wherein said stop means is a ring (41, 42) mounted around the outer edge of one race.

3. A variator according to claim 2, wherein said ring is integral with its associated disc.

4. A variator according to claim 2, wherein said ring is fitted to the rim of its associated disc so as to prevent mutual movement of said ring and the associated disc in at least one axial direction.

5. A variator according to claim 4, wherein one of said input discs (5) serves as a piston of a hydraulic end load piston-and-cylinder combination (8) and said ring carries a piston seal (44) for the piston-and-cylinder combination (8).

6. A variator according to claim 1, wherein said stop means (30, 33), which resist a said roller running off the inner edge of the race, engages with a flat face (36) of the roller tending to overshoot.

7. A variator according to claim 6, wherein said stop means is associated with at least one of said discs (4, 5) which rotates with a shaft (1) passing centrally through said variator and said stop means is mounted on that shaft.

8. A variator according to claim 6, wherein said stop means is associated with at least one of said disc (11, 12) which rotates, with clearance, about a central shaft (1) of said variator, and said stop means is mounted on a collar member (34) which engages said at least one of said by a central cavity (35).

9. A variator according to claim 1, wherein said variator is disposed in a transmission.

10. A variator for a continuously-variable-ratio transmission of the toroidal-race rolling-traction type, said variator comprising:

a plurality of rollers (20);

input discs (4, 5) and output discs (11, 12) each having an inner and an outer edge and each forming part-toroidal races (22, 23), each of said plurality of rollers spaning a toroidal clearance between its respective input and output discs diametrically, and a center (20b) of each of said plurality of rollers being capable of limited movement back and forth, during use, along a center circle (22a) of the toroidal clearance;

wherein stop means (40, 41, 30, 33) are mounted adjacent both the inner and outer edges of the part-toroidal races (22, 23) of both said input and said output discs between which said plurality of rollers are positioned in order to prevent each of said plurality of rollers from running off one of the inner and outer edges;

said stop means is a ring (41, 42) mounted around the outer edge of one race; and a race-contacting rim (50) of each of said plurality of rollers is rounded to present a roller cross-radius, and a working face (53) of said ring, which receives one of said plurality of rollers when the roller overshoots, matches a curvature generated by a outline of the overshooting roller.

11. A variator for a continuously-variable-ratio transmission of the toroidal-race rolling-traction type, said variator comprising:

a plurality of rollers (20);

input discs (4, 5) and output discs (11, 12) each having an inner and an outer edge and each forming part-toroidal races (22, 23), each of said plurality of rollers spaning a toroidal clearance between its respective input and output discs diametrically, and a center (20b) of each of said plurality of rollers being capable of limited movement back and forth, during use, along a center circle (22a) of the toroidal clearance;

wherein stop means (40, 41, 30, 33) are mounted adjacent both the inner and outer edges of the part-toroidal races (22, 23) of both said input and said output discs between which said plurality of rollers are positioned in order to prevent each of said plurality of rollers from running off one of the inner and outer edges; and said plurality of rollers are connected to respective operating mechanisms (D, E) in a manner exhibiting a caster angle (L) with respect to a plane (M) of the center circle (K) of the toroidal clearance.

* * * * *